US012439311B2

United States Patent
Nagalapur et al.

(10) Patent No.: US 12,439,311 B2
(45) Date of Patent: Oct. 7, 2025

(54) MIGRATION OF USER EQUIPMENT IN AN INTEGRATED ACCESS AND BACKHAUL NETWORK

(71) Applicant: Telefonaktiebolaget LM Ericsson (publ), Stockholm (SE)

(72) Inventors: Keerthi Kumar Nagalapur, Gothenburg (SE); Per-Erik Eriksson, Stockholm (SE); Jingya Li, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 372 days.

(21) Appl. No.: 18/014,383

(22) PCT Filed: Jul. 6, 2020

(86) PCT No.: PCT/EP2020/068994
§ 371 (c)(1),
(2) Date: Jan. 4, 2023

(87) PCT Pub. No.: WO2022/008030
PCT Pub. Date: Jan. 13, 2022

(65) Prior Publication Data
US 2023/0262544 A1    Aug. 17, 2023

(51) Int. Cl.
H04W 36/08    (2009.01)
H04W 36/00    (2009.01)
(52) U.S. Cl.
CPC ....... *H04W 36/08* (2013.01); *H04W 36/0072* (2013.01)
(58) Field of Classification Search
None
See application file for complete search history.

(56) References Cited

U.S. PATENT DOCUMENTS

2019/0357117 A1    11/2019    Cudak et al.
2020/0045596 A1    2/2020    Liu et al.
(Continued)

FOREIGN PATENT DOCUMENTS

WO    2008/031258 A1    3/2008
WO    2019245547 A1    12/2019
(Continued)

OTHER PUBLICATIONS

International Search Report and Written Opinion issued in International Application No. PCT/EP2020/068994 dated Mar. 30, 2021 (16 pages).

(Continued)

*Primary Examiner* — Kodzovi Acolatse
(74) *Attorney, Agent, or Firm* — Rothwell, Figg, Ernst & Manbeck, P.C.

(57) ABSTRACT

There is provided mechanisms for migrating UEs from node to an R-IAB node. A method is performed by a D-IAB node of the S-IAB node and the R-IAB node. The method comprises obtaining a request for replacement of the S-IAB node. The method comprises providing, to the S-IAB node, an indication of replacement of the S-IAB node. The method comprises obtaining, from the S-IAB node, scheduling information for the UEs served by the S-IAB node. The method comprises forwarding, to the R-IAB node, the scheduling information. The method comprises initiating migration of at least a subset of the UEs from the S-IAB node to the R-IAB node by providing instructions, via the S-IAB node, to at least the subset of the UEs to switch from is served by the S-IAB node to is served by the R-IAB node.

26 Claims, 8 Drawing Sheets

(56) References Cited

U.S. PATENT DOCUMENTS

| | | | |
|---|---|---|---|
| 2021/0120469 A1 | 4/2021 | Yuan et al. | |
| 2021/0168667 A1* | 6/2021 | Byun | H04W 36/0011 |
| 2021/0227435 A1* | 7/2021 | Hsieh | H04W 36/087 |
| 2021/0274394 A1* | 9/2021 | Luo | H04W 36/0033 |
| 2022/0369177 A1* | 11/2022 | Cao | H04W 36/0064 |
| 2023/0007509 A1* | 1/2023 | Cao | H04W 48/12 |

FOREIGN PATENT DOCUMENTS

| | | | | |
|---|---|---|---|---|
| WO | WO-2019246446 A1 * | 12/2019 | | H04W 36/0055 |
| WO | 2020001575 A1 | 1/2020 | | |
| WO | WO-2020067736 A1 * | 4/2020 | | H04W 36/0011 |

OTHER PUBLICATIONS

AT&T, "Route Changes Based on Intra-gNB Handover of IAB Node", 3GPP TSG-RAN WG2 Meeting #103, R2-1812405, Gothenburg, Sweden, Aug. 20-24, 2018 (4 pages).

Nokia et al., "Summary of offline discussion on CB: #43_Email043-IAB_Traffic_at_Donor_and_Intermediate_nodes", 3GPP TSG-RAN WG3 #107-e, R3-201142, Feb. 24-Mar. 6, 2020 E-Meeting (19 pages).

Qualcomm Incorporated, "Integrated Access and Backhaul for NR", 3GPP TSG RAN meeting #87e, RP-200083 (revision of RP-192518) Electronic Meeting, Mar. 16-19, 2020 (25 pages).

* cited by examiner

MIGRATION OF USER EQUIPMENT IN AN INTEGRATED ACCESS AND BACKHAUL NETWORK

CROSS REFERENCE TO RELATED APPLICATIONS

This application is a 35 U.S.C. § 371 National Stage of International Patent Application No. PCT/EP2020/068994, filed 2020 Jul. 6.

TECHNICAL FIELD

Embodiments presented herein relate to methods, a donor integrated access and backhaul (D-IAB) node, a serving integrated access and backhaul (S-IAB) node, a replacement integrated access and backhaul (R-IAB) node, computer programs, and a computer program product for migrating User Equipment (UE) from the S-IAB node to the R-IAB node.

BACKGROUND

In communications networks, there may be a challenge to obtain good performance and capacity for a given communications protocol, its parameters and the physical environment in which the communications network is deployed.

For example, densification via the deployment of more and more base stations (be them macro or micro base stations) is one of the mechanisms that can be employed to increase coverage, bandwidth and/or capacity in a communication network. However, deploying optical fiber links, or other types of cables, to the small cells, which is the usual way in which small cells are deployed, can end up being both expensive and impractical. Employing wireless links for connecting the small cells to the core network might be both cheaper and more practical. One such option is Integrated Access and Backhaul (IAB) networks, where part of the radio resources can be utilized for backhaul purposes (i.e., for communication between two IAB nodes).

In general terms, an IAB network might comprise of a donor IAB node, parent IAB nodes, and child IAB nodes. In this respect, the donor IAB node also acts as parent IAB node and a child IAB node might act as parent IAB node to another child IAB node. To readily extend the network coverage using IAB network, a child IAB node can be expected to be carried by a vehicle, such as connected and autonomous vehicle (CAV) such as aerial vehicles and ground vehicle platforms, potentially making the IAB child node portable or mobile. In such a scenario, a currently deployed child IAB node may have to be replaced by another child IAB node. For instance, a child IAB node mounted on a CAV to extend network coverage during a mission-critical (MC) operation may have to be replaced due to its battery draining out.

Existing procedures for such replacement of child IAB nodes could result in an unacceptably long interruption of the ongoing service for the served UEs.

Hence, there is still a need for improved replacement of child IAB nodes in an IAB network.

SUMMARY

An object of embodiments herein is to enable seamless replacement of child IAB nodes in an IAB network.

According to a first aspect there is presented a method for migrating UEs from node to an R-IAB node. The method is performed by a D-IAB node of the S-IAB node and the R-IAB node. The method comprises obtaining a request for replacement of the S-IAB node. The method comprises providing, to the S-IAB node, an indication of replacement of the S-IAB node. The method comprises obtaining, from the S-IAB node, scheduling information for the UEs served by the S-IAB node. The method comprises forwarding, to the R-IAB node, the scheduling information. The method comprises initiating migration of at least a subset of the UEs from the S-IAB node to the R-IAB node by providing instructions, via the S-IAB node, to at least the subset of the UEs to switch from is served by the S-IAB node to is served by the R-IAB node.

According to a second aspect there is presented a D-IAB node for migrating UEs from node to an R-IAB node. The D-IAB node comprises processing circuitry. The processing circuitry is configured to cause the D-IAB node to obtain a request for replacement of the S-IAB node. The processing circuitry is configured to cause the D-IAB node to provide, to the S-IAB node, an indication of replacement of the S-IAB node. The processing circuitry is configured to cause the D-IAB node to obtain, from the S-IAB node, scheduling information for the UEs served by the S-IAB node. The processing circuitry is configured to cause the D-IAB node to forward, to the R-IAB node, the scheduling information. The processing circuitry is configured to cause the D-IAB node to initiate migration of at least a subset of the UEs from the S-IAB node to the R-IAB node by providing instructions, via the S-IAB node, to at least the subset of the UEs to switch from is served by the S-IAB node to is served by the R-IAB node.

According to a third aspect there is presented a computer program for migrating UEs from an S-IAB node to an R-IAB node. The computer program comprises computer program code which, when run on processing circuitry of a D-IAB node, causes the D-IAB node to perform a method according to the first aspect.

According to a fourth aspect there is presented a method for migrating UEs from node to an R-IAB node. The method is performed by the S-IAB node. The method comprises obtaining, from a D-IAB node of the S-IAB node and the R-IAB node, an indication for replacement of the S-IAB node. The method comprises providing, to the R-IAB node and via the D-IAB node, scheduling information for the UEs served by the S-IAB node. The method comprises initiating migration of at least a subset of the UEs from the S-IAB node to the R-IAB node by instructing, according to instructions from the D-IAB node, at least the subset of the UEs to switch from is served by the S-IAB node to is served by the R-IAB node.

According to a fifth aspect there is presented an S-IAB node for migrating UEs from the S-IAB node to an R-IAB node. The the S-IAB node comprises processing circuitry. The processing circuitry is configured to cause the the S-IAB node to obtain, from a D-IAB node of the S-IAB node and the R-IAB node, an indication for replacement of the S-IAB node. The processing circuitry is configured to cause the the S-IAB node to provide, to the R-IAB node and via the D-IAB node, scheduling information for the UEs served by the S-IAB node. The processing circuitry is configured to cause the the S-IAB node to initiate migration of at least a subset of the UEs from the S-IAB node to the R-IAB node by instructing, according to instructions from the D-IAB node, at least the subset of the UEs to switch from is served by the S-IAB node to is served by the R-IAB node.

According to a sixth aspect there is presented a computer program for migrating UEs from an S-IAB node to an R-IAB node. The computer program comprises computer program code which, when run on processing circuitry of an S-IAB node, causes the S-IAB node to perform a method according to the fourth aspect.

According to a seventh aspect there is presented a method for migrating UEs from node to an R-IAB node. The method is performed by the R-IAB node. The method comprises obtaining, from the S-IAB node and via a D-IAB node of the S-IAB node and the R-IAB node, scheduling information for the UEs served by the S-IAB node. The method comprises serving, according to the scheduling information, at least a subset of the UEs upon the subset of the UEs having migrated from is served by the S-IAB node to is served by the R-IAB node.

According to an eighth aspect there is presented an R-IAB node for migrating UEs from node to the R-IAB node. The R-IAB node comprises processing circuitry. The processing circuitry is configured to cause the R-IAB node to obtain, from the S-IAB node and via a D-IAB node of the S-IAB node and the R-IAB node, scheduling information for the UEs served by the S-IAB node. The processing circuitry is configured to cause the R-IAB node to serve, according to the scheduling information, at least a subset of the UEs upon the subset of the UEs having migrated from is served by the S-IAB node to is served by the R-IAB node.

According to a tenth aspect there is presented a computer program for migrating UEs from an S-IAB node to an R-IAB node. The computer program comprises computer program code which, when run on processing circuitry of an R-IAB node, causes the R-IAB node to perform a method according to the seventh aspect.

According to an eleventh aspect there is presented a computer program product comprising a computer program according to at least one of the third aspect, the sixth aspect, and the tenth aspect and a computer readable storage medium on which the computer program is stored. The computer readable storage medium can be a non-transitory computer readable storage medium.

Advantageously these methods, this D-IAB node, this S-IAB node, this R-IAB node, these computer programs, and this computer program product provide efficient replacement of the S-IAB node with the R-IAB node in an IAB network.

Advantageously these methods, this D-IAB node, this S-IAB node, this R-IAB node, these computer programs, and this computer program product enable seamless replacement of the S-IAB node with the R-IAB node in an IAB network.

Advantageously these methods, this D-IAB node, this S-IAB node, this R-IAB node, these computer programs, and this computer program product enable replacement of the S-IAB node with the R-IAB node in an IAB network without interrupting ongoing services of the UEs.

Advantageously these methods, this D-IAB node, this S-IAB node, this R-IAB node, these computer programs, and this computer product prevent service discontinuity during the migration, which is very crucial for MC services.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
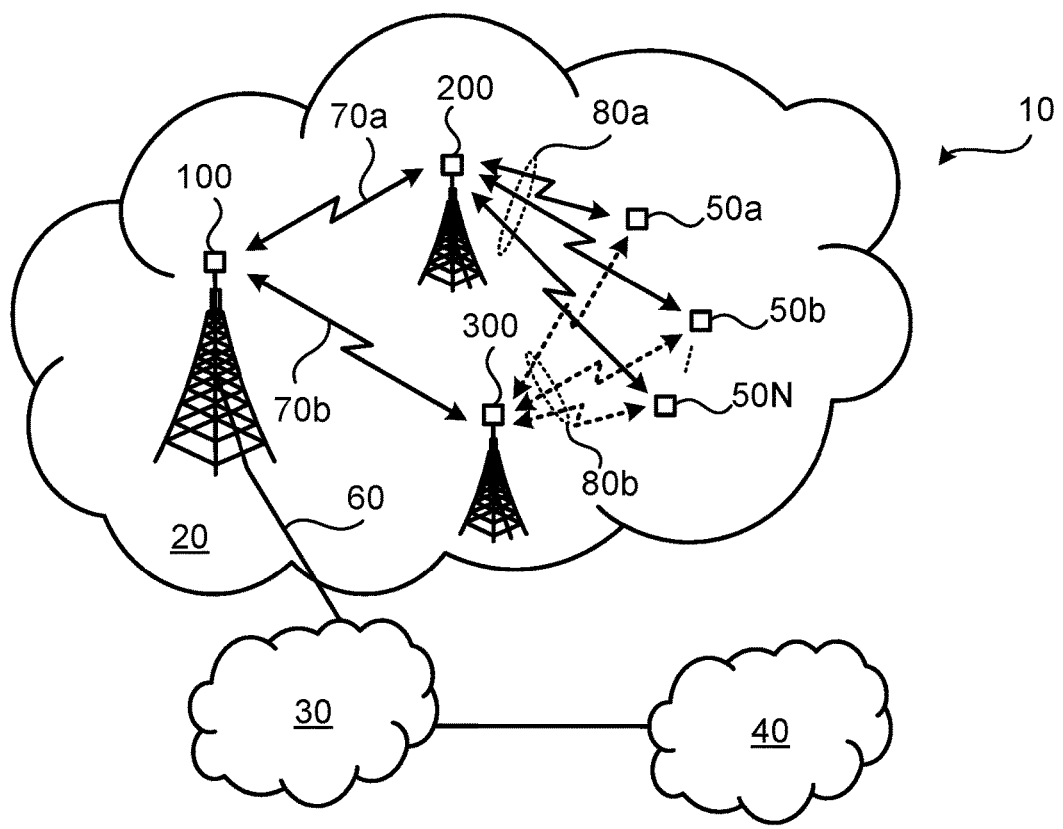
FIG. 1 is a schematic diagram illustrating an IAB network according to embodiments.

FIG. 1 is a schematic diagram illustrating an IAB network 10 where embodiments presented herein can be applied. The IAB network 10 comprises a (radio) access network 20, a core network 30, and a service network 40. In turn, the (radio) access network 20 comprises (radio) access network nodes in terms of three IAB nodes 100, 200, 300. In this respect, IAB node 100 is the only of the IAB nodes 100, 200, 300 that has a wired connection 60, such as an optical fiber connection, to the core network 30. IAB nodes 200, 300 are configured to communicate with the core network 30 via wireless backhaul links 70a, 70b to IAB node 100. Hence, IAB node 100 provides wireless backhaul for the IAB nodes 200, 300. IAB node 100 will hereinafter therefore be referred to as a donor IAB (D-IAB) node whereas IAB nodes 200, 300 might be referred to as child IAB nodes. In the illustrative examples of FIG. 1, it is assumed that UEs 50a:50N are served by IAB node 200 over wireless access links 80a, and that at least a subset of these UEs 50a:50N is to be migrated so as to be served by IAB node 300 over wireless access links 80b. IAB node 200 will hereinafter therefore be referred to as a serving IAB (S-IAB) node and IAB node 300 will hereinafter therefore be referred to as a replacement IAB (R-IAB) node. D-IAB node 100 thus provides backhaul connectivity to the S-IAB node 200 and the R-IAB node 300 and is the entry point to the (radio) access network 20 from the core network 30.

Figure 2:
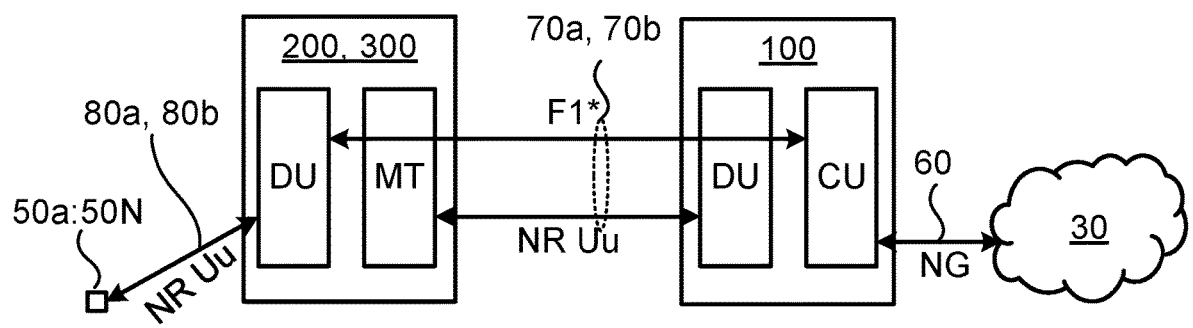
FIG. 2 is a schematic illustration of interfaces between IAB nodes according to embodiments.

As defined in 3GPP TS 38.401 entitled "NG-RAN; Architecture description", version 16.1.0, the gNB is a logical node, which may be split into one central unit (CU) and one or more distributed units (DU). The CU hosts the higher layer protocols to the UEs 50a:50N and terminates the control plane and user plane interfaces to the 5G core network (5GC). The CU controls the DU nodes over the F1 interface(s), where the DU node hosts the lower layers for the NR Uu interface to the UE. The IAB-D node 100 hosts a CU and a DU while each of the IAB child nodes only host DU which is connected to the donor CU functionality. The IAB child nodes with the DU are responsible for providing wireless access to the UEs 50a:50N and host the physical (PHY), medium access control (MAC) and radio link control (RLC) protocol layers. The IAB-D node 100 with the CU is responsible for Packet Data Convergence Protocol (PDCP) signaling and radio resource control (RRC) signaling. The mobile termination (MT) provides the physical interface for the wireless backhaul link between the IAB child nodes and the IAB-D node 100. FIG. 2 schematically illustrates interfaces over which the three IAB nodes 100, 200, 300 communicate with each other, with the core network 30, and with the UEs 50a:50N. In this respect, the CU in the D-IAB node 100 is configured to communicate with the core network 30. The CU in the D-IAB node 100 is configured to communicate with the DU in each of the S-IAB node 200 and the R-IAB node 300 over the F1 interface. The DU in the D-IAB node 100 is configured to communicate with the MT in each of the S-IAB node 200 and the R-IAB node 300 over the NR Uu interface. The DU in each of the S-IAB node 200 and the R-IAB node 300 is configured to communicate with the UEs 50a:50N over the NR Uu interface.

The embodiments disclosed herein thus relate to mechanisms for migrating UEs 50a:50N from an S-IAB node 200 to an R-IAB node 300. In order to obtain such mechanisms there is provided a D-IAB node 100, a method performed by the D-IAB node 100, a computer program product comprising code, for example in the form of a computer program, that when run on processing circuitry of the D-IAB node 100, causes the D-IAB node 100 to perform the method. In order to obtain such mechanisms there is further provided an S-IAB node 200, a method performed by the S-IAB node 200, and a computer program product comprising code, for example in the form of a computer program, that when run on processing circuitry of the S-IAB node 200, causes the S-IAB node 200 to perform the method. In order to obtain such mechanisms there is further provided an R-IAB node 300, a method performed by the R-IAB node 300, and a computer program product comprising code, for example in the form of a computer program, that when run on processing circuitry of the R-IAB node 300, causes the R-IAB node 300 to perform the method.

Figure 3:
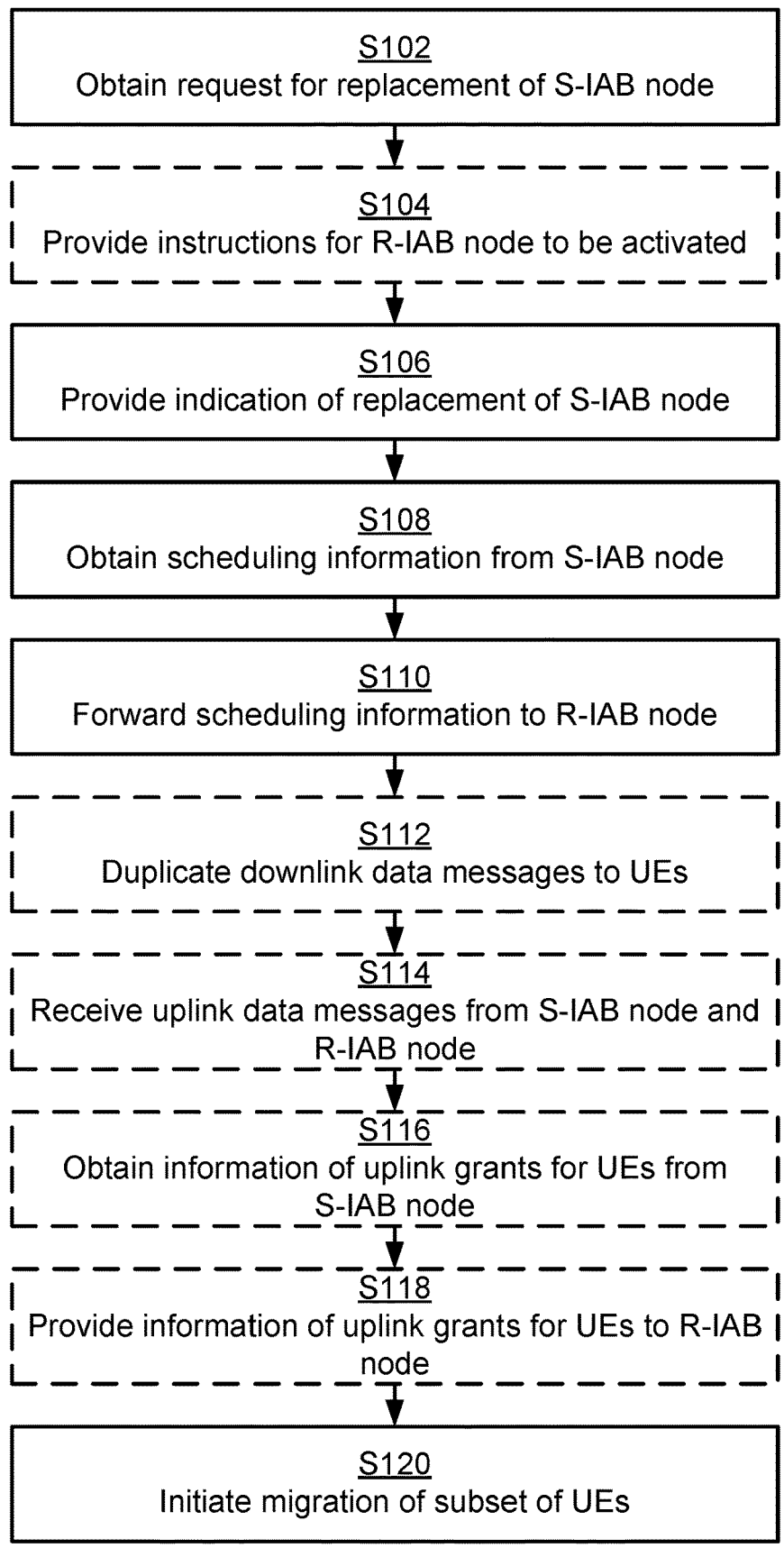
FIGS. 3, 4, and 5 are flowcharts of methods according to embodiments.

Reference is now made to FIG. 3 illustrating a method for migrating UEs 50a:50N from an S-IAB node 200 to an R-IAB node 300 as performed by the D-IAB node 100 according to an embodiment.

S102: The D-IAB node 100 obtains a request for replacement of the S-IAB node 200.

S106: The D-IAB node 100 provides, to the S-IAB node 200, an indication of replacement of the S-IAB node 200.

S108: The D-IAB node 100 obtains, from the S-IAB node 200, scheduling information for the UEs 50a:50N served by the S-IAB node 200.

S110: The D-IAB node 100 forwards, to the R-IAB node 300, the scheduling information.

S120: The D-IAB node 100 initiates migration of at least a subset of the UEs 50a:50N from the S-IAB node 200 to the R-IAB node 300 by providing instructions, via the S-IAB node 200 to at least the subset of the UEs 50a:50N to switch from being served by the S-IAB node 200 to being served by the R-IAB node 300.

Embodiments relating to further details of migrating UEs 50a:50N from an S-IAB node 200 to an R-IAB node 300 as performed by the D-IAB node 100 will now be disclosed.

In some examples, the decision to replace the S-IAB node 200 is made by the network administrator, e.g., based on a centralized monitoring data pool, in which the status of all IAB nodes is collected and stored, or by a fleet administrator when the IAB nodes are portable or mobile. The decision to replace the S-IAB node 200 might be signaled to the D-IAB node 100 via OAM signaling or fleet management signaling. In other examples, the S-IAB node 200 itself requests for a replacement, e.g., when it has a run-out-off power warning, or when it detects a hardware/software fault that prevents its proper operation. The replacement request might be reported from the S-IAB node 200 to the D-IAB node 100 as a high layer signaling over the associated F1 interface. Thus, in some embodiments, the request for replacement of the S-IAB node 200 is obtained from the S-IAB node 200 or from an entity external to the D-IAB node 100, the S-IAB node 200, and the R-IAB node 300.

In some aspects, the R-IAB node 300 is activated when the D-IAB node 100 has obtained the request in step S102. In particular, according to an embodiment, the D-IAB node 100 is configured to perform (optional) step S104:

S104: The D-IAB node 100 provides, upon having obtained the request for the replacement of the S-IAB node 200, instructions to the R-IAB node 300 for the R-IAB node 300 to be activated.

Further aspects of the scheduling information for the UEs 50a:50N served by the S-IAB node 200 as obtained by the D-IAB node 100 in step S108 from the S-IAB node 200 will now be disclosed.

In a first example, the scheduling information is sent by the S-IAB node 200 to a management system in, or connected to, the D-IAB node 100 over over a logic operations and maintenance (OAM) channel. The D-IAB node 100 will then relay this information through its logic OAM channel to the R-IAB node 300. The OAM might poll the S-IAB node 200 for any changes in the scheduling to forward this information to the R-IAB node 300. In a second example, the S-IAB node 200 sends the scheduling information to the CU in the D-IAB node 100 as a (non-UE associated) F1 Application Protocol message. The CU in the D-IAB node 100 then sends the received scheduling information to the R-IAB node 300 as a F1 Application Protocol message. That is, in some embodiments, the scheduling information is obtained and forwarded over a logic operations and maintenance channel or in an F1 Application Protocol message.

In some aspects, downlink (DL) data is sent to the UEs 50a:50N via both the S-IAB node 200 and the R-IAB node 300 and/or uplink (UL) data from the UEs 50a:50N is received from both the S-IAB node 200 and the R-IAB node 300. Thus, according to an embodiment, the D-IAB node 100 is configured to perform (optional) step S112 and/or (optional) step S114:

S112: The D-IAB node 100 duplicates downlink data messages destined for the UEs 50a:50N for forwarding of the downlink data messages to both the S-IAB node 200 and the R-IAB node 300 whilst the UEs 50a:50N are still served by the S-IAB node 200.

S114: The D-IAB node 100 receives uplink messages originating from the UEs 50a:50N from both the S-IAB node 200 and the R-IAB node 300 whilst the UEs 50a:50N are still served by the S-IAB node 200.

In general terms, as opposed to handover of an individual UE 50a:50N from the S-IAB node 200 to the R-IAB node 300, replacement of the S-IAB node 200 involves migrating all the UEs 50a:50N from the S-IAB node 200 to R-IAB node 300 before the S-IAB node 200 ceases to function or is removed. There can be different triggers for performing the actual migration of the UEs 50a:50N from the S-IAB node 200 to the R-IAB node 300. In some non-limiting examples, the decision to migrate the UEs 50a:50N is triggered when a chosen signal strength metric, e.g., any of Received Signal Strength Indicator (RSSI), Reference Signal Receive Power (RSRP), Reference Signal Receive Quality (RSRQ), measured by each UE 50a:50N with respect to the R-IAB node 300 exceeds a pre-defined threshold. The pre-defined threshold might be selected such that a minimum Quality of Service (QoS) for a specific service can be guaranteed. In some non-limiting examples, the decision to migrate the UEs 50a:50N is triggered when a selected signal strength metric, e.g., any of RSSI, RSRP, RSRQ, measured by each UE 50a:50N with respect to the R-IAB node 300 is a predefined offset value better than the same signal strength metric measured from the S-IAB node 200. This triggering criterion can be used in combination with reducing the transmit power of the measurement signal transmitted from the S-IAB node 200. In some non-limiting examples, the decision to migrate the UEs 50a:50N is triggered when a certain fraction of the UEs 50a:50N whose measurement report satisfies the threshold. In some non-limiting examples, the decision to migrate all the UEs 50a:50N to the R-IAB node 300 is triggered based on the fraction of the UL transmissions being successfully decoded at the R-IAB node 300, referred to as packet success ratio (PSR). The migration can then be triggered when the UL PSR at the R-IAB node 300 exceeds a certain predetermined threshold or when the UL PSR at the R-IAB node 300 exceeds the UL PSR at the S-IAB node 200. In some embodiments, the D-IAB node 100 verifies that a trigger condition for migration of at least the subset of the UEs 50a:50N is fulfilled before initiating migration of at least the subset of the UEs 50a:50N. In some embodiments, the trigger condition pertains to link quality between the UEs 50a:50N and R-IAB node 300, without pertaining to link quality between UEs 50a:50N and S-IAB node 200.

As will be disclosed in more detail below, in some aspects, the S-IAB node 200 informs the R-IAB node 300 of uplink grants for the UEs 50a:50N. Particularly, according to an embodiment, the D-IAB node 100 is configured to perform (optional) steps S116 and S118:

S104: The D-IAB node 100 obtains, from the S-IAB node 200, information of uplink grants according to which the UEs 50a:50N served by the S-IAB node 200 are to send handover complete messages to the R-IAB node 300 upon completion of the migration.

S118: The D-IAB node 100 forwards the information of uplink grants to the R-IAB node 300. The UEs 50a:50N are notified of the uplink grants when being provided with the instructions in step S120 from the D-IAB node 100.

The uplink grant information could be sent via the same means as the scheduling information is sent to the R-IAB node 300 from the S-IAB node 200, i.e., over an OAM channel or using dedicated F1AP messages.

As disclosed above, migration is initiated of at least a subset of the UEs 50a:50N from the S-IAB node 200 to the R-IAB node 300. There could be different ways to select which UEs 50a:50N to be migrated. In some aspects, the subset of UEs 50a:50N is selected based on service type, e.g. MC services. In particular, in some embodiments, the subset of UEs 50a:50N is selected according to a criterion pertaining to a priority order as given by service type for the UEs 50a:50N. Migration of UEs 50a:50N having MC services might thereby be prioritized over migration of UEs 50a:50N having non-MC services How UEs 50a:50N switch from S-IAB node 200 to R-IAB node 300: switch identifiers In some embodiments, the UEs 50a:50N are instructed to switch from being served by the S-IAB node 200 to being served by the R-IAB node 300 by being instructed to use an identifier of the R-IAB node 300 in all places where an identifier of the S-IAB node 200 is used.

Figure 4:
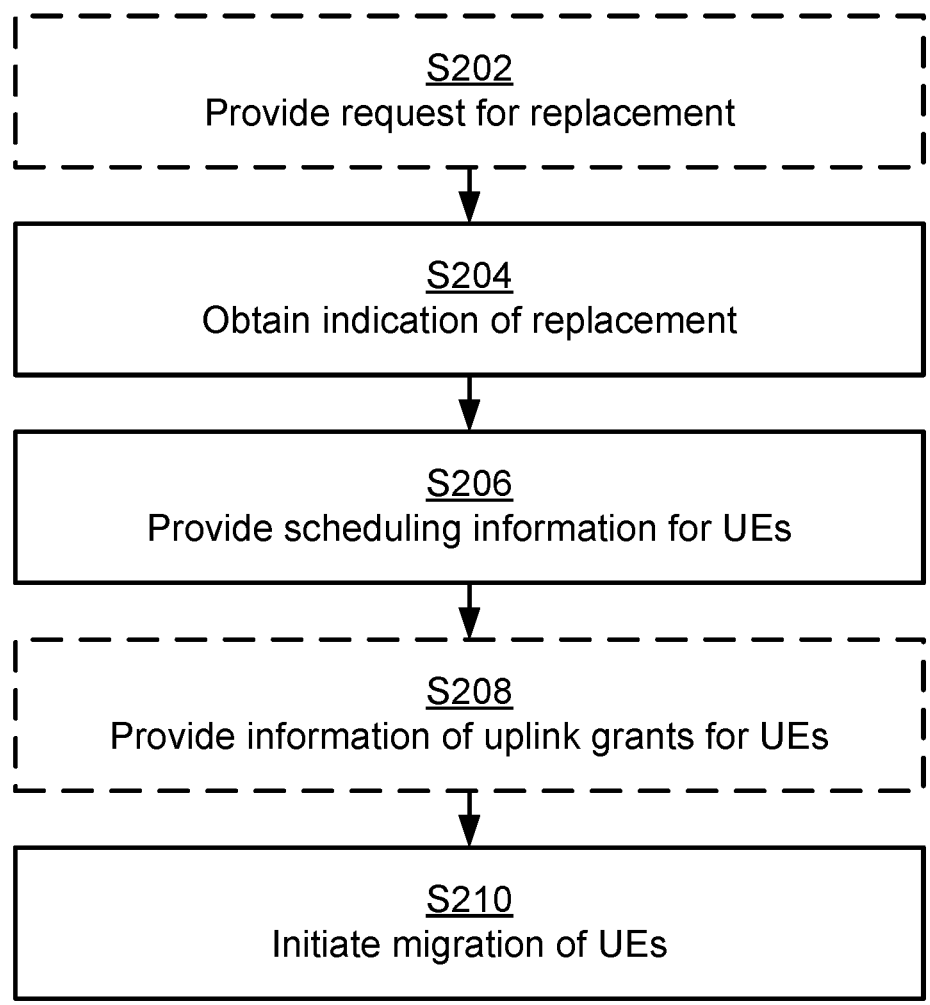

Reference is now made to FIG. 4 illustrating a method for migrating UEs 50a:50N from an S-IAB node 200 to an R-IAB node 300 as performed by the S-IAB node 200 according to an embodiment.

S204: The S-IAB node 200 obtains, from the D-IAB node 100 of the S-IAB node 200 and the R-IAB node 300, an indication for replacement of the S-IAB node 200.

S206: The S-IAB node 200 provides, to the R-IAB node 300 and via the D-IAB node 100, scheduling information for the UEs 50a:50N served by the S-IAB node 200.

S210: The S-IAB node 200 initiates migration of at least a subset of the UEs 50a:50N from the S-IAB node 200 to the R-IAB node 300 by instructing, according to instructions from the D-IAB node 100, at least the subset of the UEs 50a:50N to switch from being served by the S-IAB node 200 to being served by the R-IAB node 300.

Embodiments relating to further details of migrating UEs 50a:50N from an S-IAB node 200 to an R-IAB node 300 as performed by the S-IAB node 200 will now be disclosed.

As disclosed above, in some examples, the S-IAB node 200 itself requests for a replacement, e.g., when it has a run-out-off power warning, or when it detects a hardware/software fault that prevents its proper operation. Thus, according to an embodiment, the S-IAB node 200 is configured to perform (optional) step S202:

S202: The S-IAB node 200 provides, to the D-IAB node 100, a request for the replacement of the S-IAB node 200.

Aspects of how the scheduling information might be provided from the S-IAB node 200 to the R-IAB node 300 via the D-IAB node 100 have been disclosed above and apply here as well. In some embodiments, the scheduling information is provided over a logic operations and maintenance channel or in an F1 Application Protocol message.

When performing non-coherent joint transmission of the same pieces of data, the precoders, or beamforming weights, at the S-IAB node 200 and the R-IAB node 300 should be selected such that the UEs 50a:50N receive power from both of the S-IAB node 200 and the R-IAB node 300 and so that the UEs 50a:50N are unaware of the transmissions from R-IAB 300 and can still continue to transmit and receive data. Since a UE 50a:50N is unaware of a transmission from R-IAB node 300 at this point, the UE 50a:50N cannot report a precoder to be used by the R-IAB node 300 for transmission towards it.

Therefore, in some examples, to simplify the process of selecting precoders at both the S-IAB node 200 and the R-IAB node 300 when performing simultaneous transmission, the number of transmit spatial layers, or rank, towards all UEs 50a:50N is fixed to 1 and a precoder that performs non-frequency-selective wide-beam transmission is selected for both the S-IAB node 200 and the R-IAB node 300. Further, in some examples, to simplify the process of selecting precoders at both the S-IAB node 200 and the R-IAB node 300 when performing simultaneous transmission the number of transmit spatial layers, or rank, towards all UEs 50a:50N is fixed to 1, and the S-IAB node 200 uses the precoder reported by the UE 50a:50N for rank 1, and the S-IAB node 200 instructs the R-IAB node 300 to perform a non-frequency-selective wide-beam transmission. Hence, in some embodiments, according to the scheduling information, the number of transmit spatial layers to be used for transmission towards the UEs 50a:50N until the UEs 50a:50N have been migrated is fixed to 1. Hence, in some embodiments, according to the scheduling information, the R-IAB node 300 is to use non-frequency selective wide-beam transmission when communicating with the UEs 50a:50N until the UEs 50a:50N have been migrated. In some non-limiting examples, the scheduling information for each of the UEs 50a:50N specifies at least one of: time/frequency resources, modulation and coding scheme, transmission rank, precoder to be used, reference signal configuration.

In some aspects, the S-IAB node 200 informs the R-IAB node 300 of uplink grants for the UEs 50a:50N. Particularly, according to an embodiment, the S-IAB node 200 is configured to perform (optional) step S208:

S208: The S-IAB node 200 provides, to the R-IAB node 300 and via the D-IAB node 100, information of uplink grants according to which the UEs 50a:50N served by the S-IAB node 200 are to send handover complete messages to the R-IAB node 300 upon completion of the migration. The instructions from the D-IAB node 100 then comprises a notification of the uplink grants.

There could be different ways in which the UEs 50a:50N switch from being served by the S-IAB node 200 to being served by the R-IAB node 300. In some embodiments, the UEs 50a:50N are instructed to switch from being served by the S-IAB node 200 to being served by the R-IAB node 300 by being instructed to use an identifier of the R-IAB node 300 in all places where an identifier of the S-IAB node 200 is used.

Figure 5:
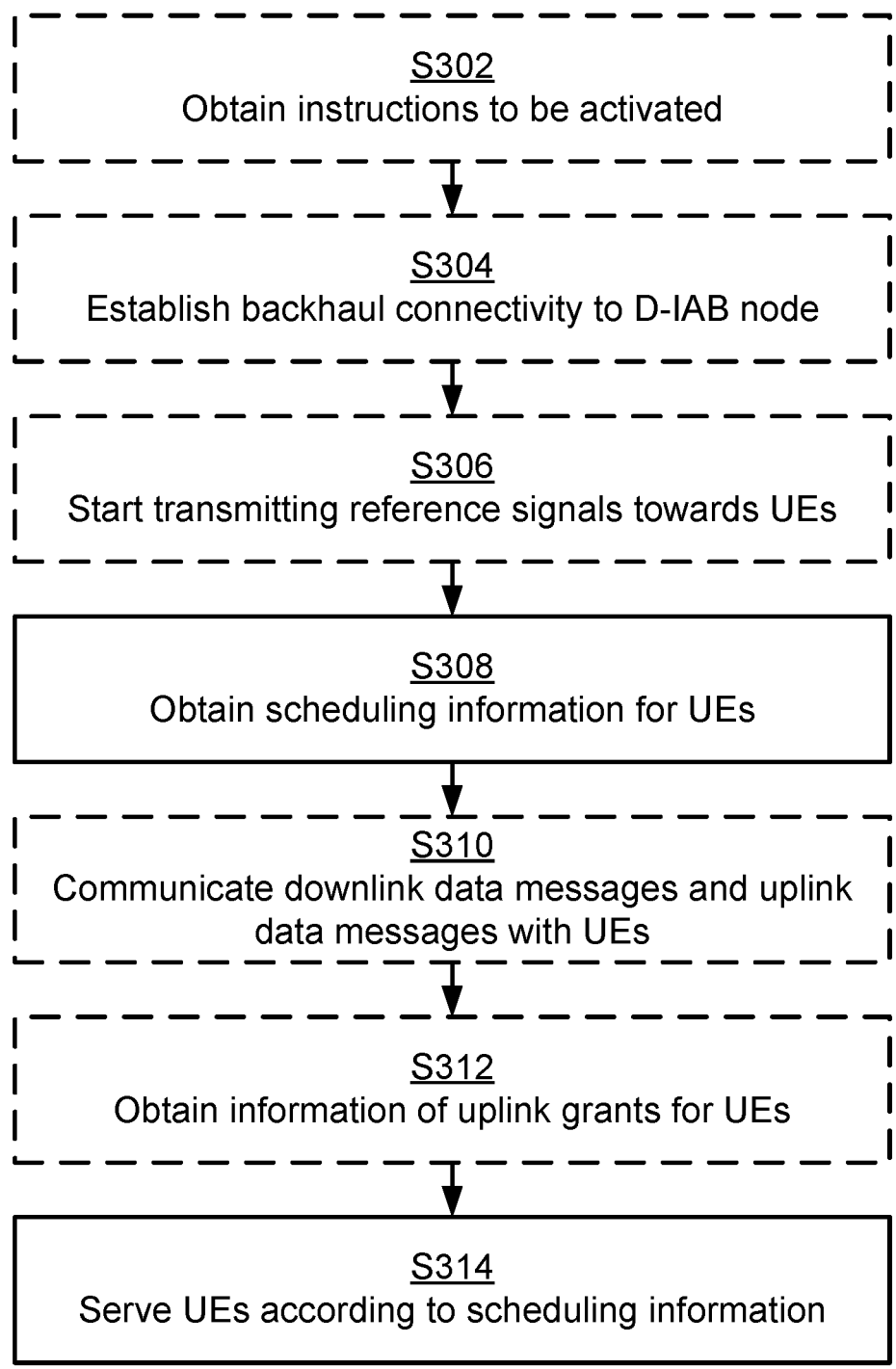

Reference is now made to FIG. 5 illustrating a method for migrating UEs 50a:50N from an S-IAB node 200 to an R-IAB node 300 as performed by the R-IAB node 300 according to an embodiment.

S308: The R-IAB node 300 obtains S308, from the S-IAB node 200 and via the D-IAB node 100 of the S-IAB node 200 and the R-IAB node 300, scheduling information for the UEs 50a:50N served by the S-IAB node 200.

S314: The R-IAB node 300 serves, according to the scheduling information, at least a subset of the UEs 50a:50N upon the subset of the UEs 50a:50N having migrated from being served by the S-IAB node 200 to being served by the R-IAB node 300.

Embodiments relating to further details of migrating UEs 50a:50N from an S-IAB node 200 to an R-IAB node 300 as performed by the R-IAB node 300 will now be disclosed.

As disclosed above, in some aspects, the R-IAB node 300 is activated when the D-IAB node 100 has obtained the request in step S102. In particular, according to an embodiment, the R-IAB node 300 is configured to perform (optional) steps S302 and S304:

S302: The R-IAB node 300 obtains, from the D-IAB node 100, instructions for the R-IAB node 300 to be activated.

S304: The R-IAB node 300, in response thereto (i.e., in response to having obtained the instructions), establishes backhaul connectivity to the D-IAB node 100.

Upon having been activated, the R-IAB node 300 might start transmitting reference signals, and optionally, the same system information as transmitted from the S-IAB node 200. That is, according to an embodiment, the R-IAB node 300 is configured to perform (optional) step S306:

S306: The R-IAB node 300 starts transmitting reference signals (and, optionally, the same system information as transmitted from the S-IAB node 200) towards the UEs 50a:50N upon having established the backhaul connectivity to the D-IAB node 100.

Aspects of how the scheduling information might be provided from the S-IAB node 200 to the R-IAB node 300 via the D-IAB node 100 have been disclosed above and apply here as well. In some embodiments, the scheduling information is obtained over a logic operations and maintenance channel or in an F1 Application Protocol message. As disclosed above, in some embodiments, according to the scheduling information, the number of transmit spatial layers to be used for transmission towards the UEs 50a:50N until the UEs 50a:50N have been migrated is fixed to 1. As disclosed above, in some embodiments, according to the scheduling information, the R-IAB node 300 is to use non-frequency selective wide-beam transmission when communicating with the UEs 50a:50N until the UEs 50a:50N have been migrated. As disclosed above, in some non-limiting examples, the scheduling information for each of the UEs 50a:50N specifies at least one of: time/frequency resources, modulation and coding scheme, transmission rank, precoder to be used, reference signal configuration.

As disclosed above, in some aspects, DL data is sent to the UEs 50a:50N via both the S-IAB node 200 and the R-IAB node 300. Thus, according to an embodiment, the R-IAB node 300 is configured to perform (optional) step S310:

S310: The R-IAB node 300 communicates downlink data messages and uplink data messages with the UEs 50a:50N according to the scheduling information whilst the UEs 50a:50N are still served by the S-IAB node 200.

As disclosed above, in some aspects, UL data from the UEs 50a:50N is received by the D-IAB node 100 from both the S-IAB node 200 and the R-IAB node 300. Thus, according to an embodiment, the R-IAB node 300 is configured to perform (optional) step S312:

S312: The R-IAB node 300 obtains, from the S-IAB node 200 and via the D-IAB node 100, information of uplink grants according to which the UEs 50a:50N served by the S-IAB node 200 are to send handover complete messages to the R-IAB node 300 upon completion of the migration.

Figure 6:
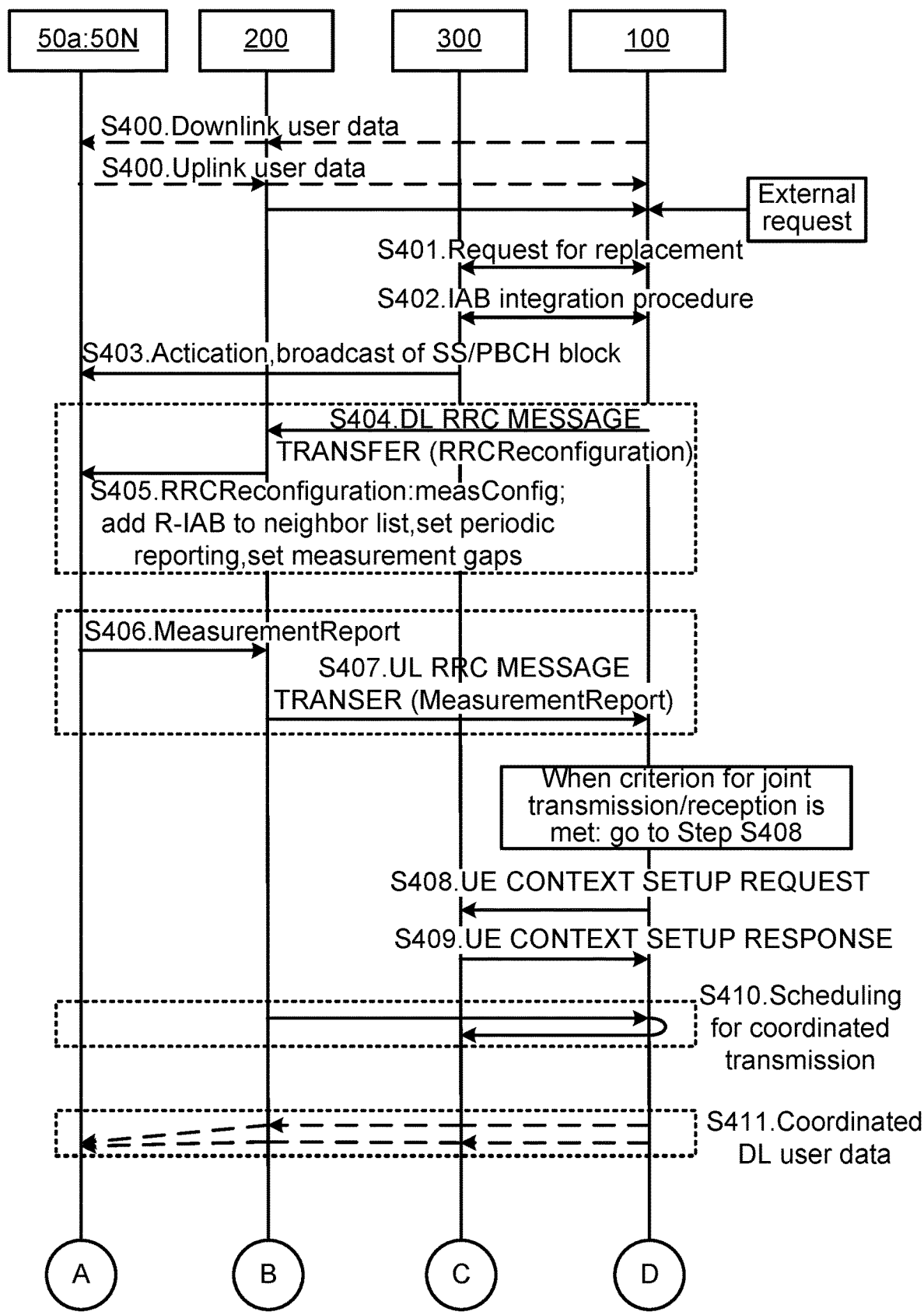
FIG. 6 is a signalling diagram according to an embodiment.
Figure 6:
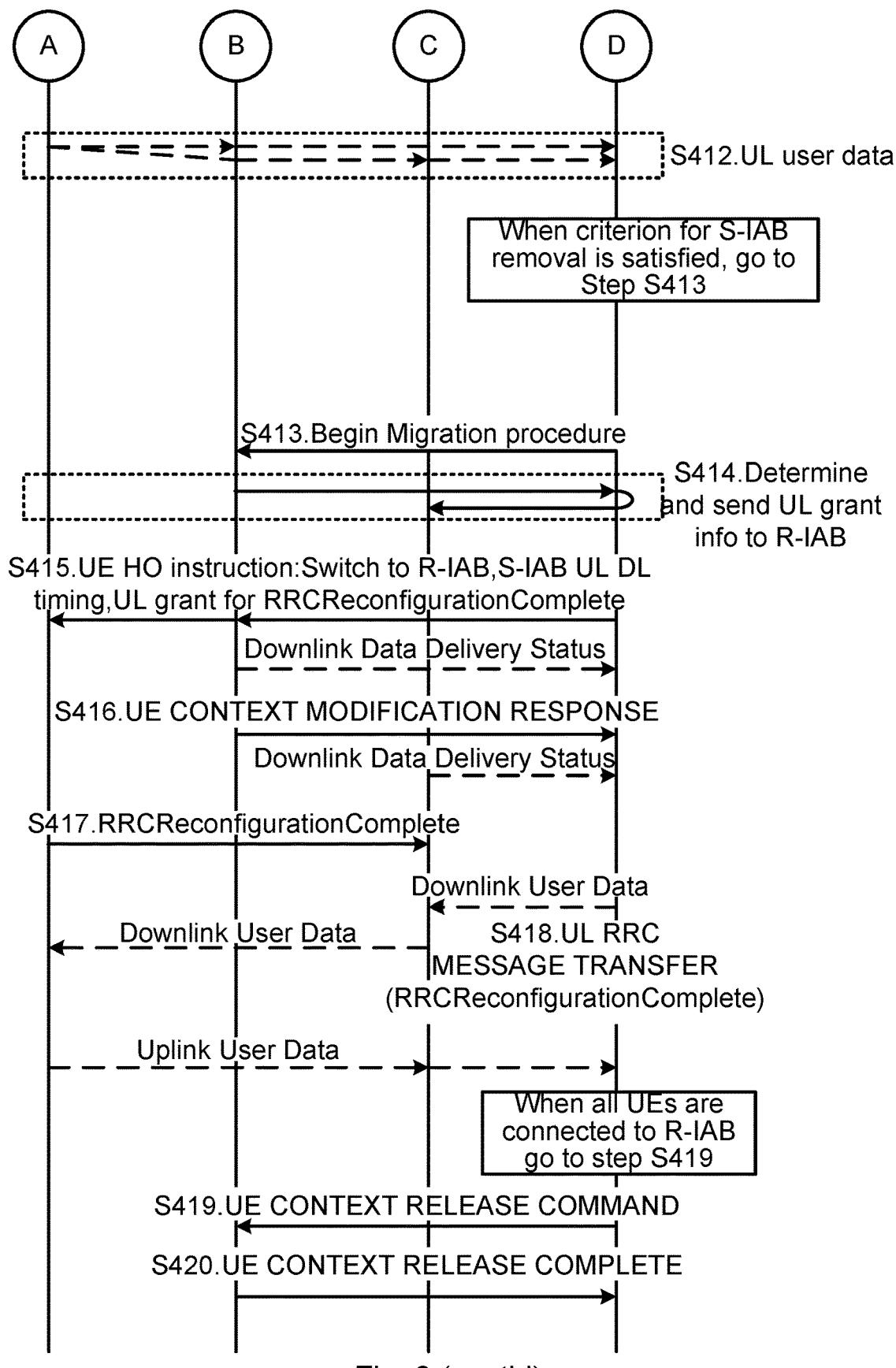

One particular embodiment for migrating UEs 50a:50N from an S-IAB node 200 to an R-IAB node 300 based on at least some of the above disclosed embodiments will now be disclosed in detail with reference to the signalling diagram of FIG. 6.

S400: Data communication.

Downlink user data and uplink data is communicated between the S-IAB node 200 and the UEs 50a:50N served by the S-IAB node 200.

S401: Initiation of S-IAB node 200 replacement procedure.

The D-IAB node 100 obtains a request that the S-IAB node 200 needs replacement. As disclosed above, in some examples the request for replacement of the S-IAB node 200 is obtained from the S-IAB node 200, whereas in other examples the request for replacement of the S-IAB node 200 is obtained from an external entity (i.e., an entity external to the D-IAB node 100, the S-IAB node 200, and the R-IAB node 300)

S402, S403: Activate R-IAB node 300 and connection establishment.

The D-IAB 100 triggers the R-IAB node to be activated. An IAB integration procedure is performed for the R-IAB 300 to establish backhaul connectivity between the R-IAB node 300 and the D-IAB node 100. After backhaul establishment, the R-IAB node 300 starts broadcast of reference signals.

S404, S405, S406, S407: Measurement configuration and measurement reporting.

The D-IAB node 100 node adds information of the R-IAB node 300 to its neighbor list and includes the information in an RRC reconfiguration message. This message is, via the S-IAB 200, delivered to all UEs 50a:50N served by S-IAB node 200. These UEs 50a:50N can perform measurements on access links to the R-IAB node 300 and report these measurements to the S-IAB node 200 accordingly.

The D-IAB node 100 signals the RRC reconfiguration message over the F1 interface to the S-IAB node 200 (step S404), and the S-IAB node 200 forwards the RRC reconfiguration message to all the UEs (step S406).

The S-IAB node 200 also signals a UE specific measurement reporting configuration to each of the served UEs 50a:50N via dedicated RRC signaling. The content of the measurement reporting includes the time/frequency resources to use for the reporting and the format to use for the reporting.

After receiving the measurement configuration, the UEs 50a:50N measure the link quality with respect to R-IAB node 300 by measuring on the reference signals transmitted by R-IAB node 300. The UEs 50a:50N send their measurement reports to the S-IAB node 200 (step S406). The S-IAB node 200 forwards the measurement reports to the D-IAB node 100 (step S407).

Steps S404-S407 might be omitted when Automatic Neighbor Relation (ANR) is enabled, in which case the UEs 50a:50N discover a new cell (as defined by the R-IAB 300) without being explicitly instructed, or configured, to do so and report the measurements on signals from the R-IAB 300 to the serving cell (as defined by S-IAB 200).

When the link quality reported by the UEs 50a:50N with respect to R-IAB node 300 satisfies a certain criterion, for example when the link quality exceeds a threshold, the D-IAB node 100 triggers the following steps for performing joint transmission and reception.

S408, S409: UE context setup.

The D-IAB 100 sends a UE context setup request message to the R-IAB node 300 (step S408) and the R-IAB node 300 responds with a UE context setup response message to the D-IAB 100.

The UE context setup request message requests the R-IAB node 300 to prepare for the handover of a UE 50a:50N and provides the R-IAB node 300 with information related to the UE 50a:50N. The information consists of, among other things, the necessary information required to maintain the network services towards an active UE 50a: 50N, such as UE state information, UE identities, security information and UE capability information. The R-IAB node 300 responds with a UE context setup response when the preparation for the handover is successful.

In an example, the UE context setup request and response procedure is repeated for all the UEs 50a:50N being served by the S-IAB node 200. In another example, a context setup request for all the UEs 50a:50N currently served by the S-IAB node 200 is sent to the R-IAB node 300 in a single request message and the R-IAB node 300 responds with a single response message.

S410: Joint scheduling.

To perform coordinated transmission and reception, the S-IAB node 200 and the R-IAB node 300 use the same scheduling information. This can be achieved using the different options as disclosed above.

The S-IAB node 200 continues to schedule the served UEs 50a:50N and the scheduling information is forwarded to the R-IAB node 300 through the D-IAB node 100. The scheduling decision is made by taking the control signaling forwarding delay into account. For instance, to account for the delay in forwarding to the R-IAB node 300, the S-IAB node 200 schedules its transmissions a few time slots in advance.

The scheduling information transmitted to R-IAB node 300 contains the information necessary for simultaneous transmission, including but not limited to, the time/frequency resources for every served UE 50a:50N, modulation and coding scheme used, transmission rank used, precoder to be used, reference signal configuration, etc.

Examples of how the scheduling information can be transmitted from the S-IAB node 200 to the R-IAB node 300 via D-IAB node 100 have been disclosed above and apply here as well.

S411: Coordinated/simultaneous DL data transmission.

For DL transmissions, PDCP packets intended for the UEs 50a:50N are duplicated at the D-IAB node 100 and sent to both the S-IAB node 200 and the R-IAB node 300. Using the scheduling information (from step S410) available at both the S-IAB node 200 and R-IAB node 300, identical signals are transmitted from the S-IAB node 200 and R-IAB node 300 to the UEs 50a:50N. Since the signals transmitted from the IAB child nodes (i.e., from the S-IAB node 200 and the R-IAB node 300) are identical, the coordinated transmission is transparent to the UEs 50a:50N with the effective channel being different.

At the UE side, the DL reception timing for receiving DL transmissions from the S-IAB node 200 might also be used for the reception of the joint transmissions from both S-IAB node 200 and R-IAB node 300.

To perform simultaneous transmission without significant intersymbol interference, the cell timing synchronization accuracy between S-IAB node 200 and the R-IAB node 300 has to be within a desired value, such as 3 μs Existing over-the-air synchronization mechanisms, e.g., variants of the IEEE 1588 precision-time-protocol, can be utilized to enable this.

S412: Simultaneous UL data reception

For UL transmissions, both the S-IAB node 200 and the R-IAB node 300 independently of each other decode packets received from the UEs 50a:50N and forward the decoded packets to the D-IAB node 100. The D-IAB node 100 receives the packets from the S-IAB node 200 and the R-IAB node 300 and removes any duplicate packets received from both the S-IAB node 200 and the R-IAB node 300 before forwarding the packets to the core network.

In some aspects, the R-IAB node 300 and the S-IAB node 200 are located close to each other such that the propagation delay between the S-IAB node 200 and a given UE, and the propagation delay between the R-IAB node 300 and the same given UE is similar. This implies that the timing advances of the given UE with respect to R-IAB node 300 will be similar to the timing advance of the same given UE with respect to the S-IAB node 200. Therefore, when the UEs 50a:50N perform an UL transmission towards the S-IAB node 200, the R-IAB node 300 can expect the transmission to be time aligned, within a fraction of the cyclic prefix duration, with UL transmissions of other UEs.

In some aspects, at the UE side, the timing advance (TA) for UL transmissions with respect to the S-IAB node 200 already available at the UEs 50a:50N also serves as the TA for the UL transmission to both the S-IAB node 200 and the R-IAB node 300.

S413-S420: Migration of UEs 50a:50N from the S-IAB node200 to the R-IAB node 300.

When any of the migration criteria as disclosed above is met, the D-IAB node 100 instructs the S-IAB node 200 to begin the migration procedure (step S413).

The S-IAB node 200 determines UL grants for the UEs 50a:50N to perform UL transmissions carrying handover complete (RRC Reconfiguration Complete) message towards the R-IAB node 300 (step S414). The determined UL grant is sent to the R-IAB node 300 via the D-IAB node 100 using the mechanisms detailed in step S410.

A UE handover instruction message is sent by the D-IAB node 100 to the UEs 50a:50N via the S-IAB node 200, instructing the UEs 50a:50N to switch to the R-IAB node 300 (step S415). The UE handover instruction message also includes the TA and the UL grants to be used by the UEs 50a:50N for transmission towards the R-IAB node 300.

When the S-IAB node 200 receives the UE handover instruction message from the D-IAB node 100, the S-IAB node 200 acknowledges receipt of the message to the D-IAB node 100 (step S416).

The UEs 50a:50N transmit a RRC Reconfiguration Complete message to the R-IAB node 300 confirming that the UEs 50a:50N have established a connection to the R-IAB node 300 (step S417). The R-IAB node 300 forwards the received messages to the D-IAB node 100 (step S418).

When the RRC Reconfiguration Complete messages from all the UEs 50a:50N are received by the D-IAB node 100, the UE context from the S-IAB node 200 is released (steps S419 and S420) and the S-IAB node 200 can be withdrawn from operation.

Figure 7:
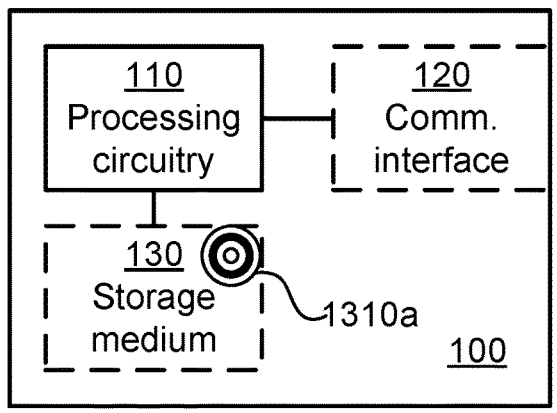
FIG. 7 is a schematic diagram showing functional units of a D-IAB node according to an embodiment.

FIG. 7 schematically illustrates, in terms of a number of functional units, the components of a D-IAB node 100 according to an embodiment. Processing circuitry 110 is provided using any combination of one or more of a suitable central processing unit (CPU), multiprocessor, microcontroller, digital signal processor (DSP), etc., capable of executing software instructions stored in a computer program product 1310a (as in FIG. 13), e.g. in the form of a storage medium 130. The processing circuitry 110 may further be provided as at least one application specific integrated circuit (ASIC), or field programmable gate array (FPGA).

Particularly, the processing circuitry 110 is configured to cause the D-IAB node 100 to perform a set of operations, or steps, as disclosed above. For example, the storage medium 130 may store the set of operations, and the processing circuitry 110 may be configured to retrieve the set of operations from the storage medium 130 to cause the D-IAB node 100 to perform the set of operations. The set of operations may be provided as a set of executable instructions. Thus the processing circuitry 110 is thereby arranged to execute methods as herein disclosed.

The storage medium 130 may also comprise persistent storage, which, for example, can be any single one or combination of magnetic memory, optical memory, solid state memory or even remotely mounted memory.

The D-IAB node 100 may further comprise a communications interface 120 for communications with the S-IAB node 200, the R-IAB node 300 and the UEs 50a:50N. As such the communications interface 120 may comprise one or more transmitters and receivers, comprising analogue and digital components.

The processing circuitry 110 controls the general operation of the D-IAB node 100 e.g. by sending data and control signals to the communications interface 120 and the storage medium 130, by receiving data and reports from the communications interface 120, and by retrieving data and instructions from the storage medium 130. Other components, as well as the related functionality, of the D-IAB node 100 are omitted in order not to obscure the concepts presented herein.

Figure 8:
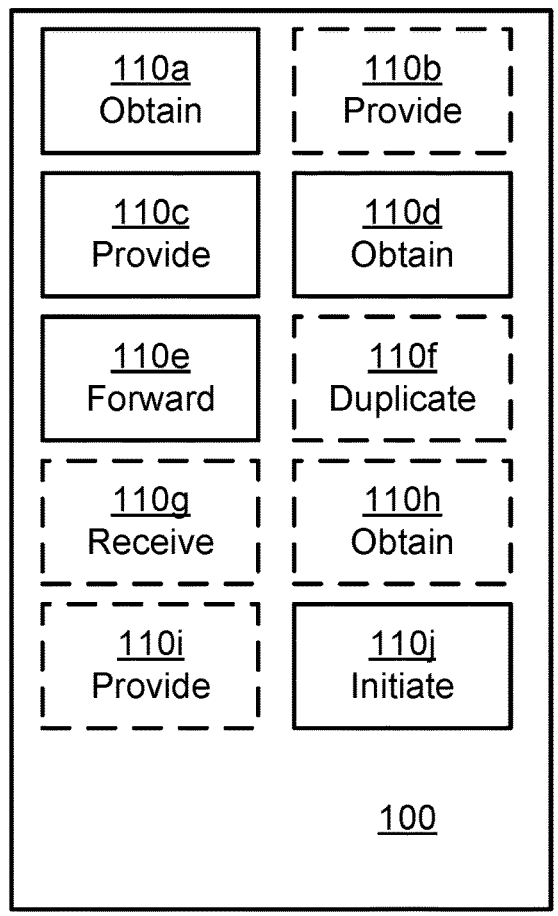
FIG. 8 is a schematic diagram showing functional modules of a D-IAB node according to an embodiment.

FIG. 8 schematically illustrates, in terms of a number of functional modules, the components of a D-IAB node 100 according to an embodiment. The D-IAB node 100 of FIG. 8 comprises a number of functional modules; an obtain module 110a configured to perform step S102, a provide module 110c configured to perform step S106, an obtain module 110d configured to perform step S108, a forward module 110e configured to perform step S110, and an initiate module 110j configured to perform step S120. The D-IAB node 100 of FIG. 8 may further comprise a number of optional functional modules, such as any of a provide module 110b configured to perform step S104, a duplicate module 110f configured to perform step S112, a receive module 110g configured to perform step S114, an obtain module 110h configured to perform step S116, a provide module 110i configured to perform step S118.

In general terms, each functional module 110a-110j may be implemented in hardware or in software. Preferably, one or more or all functional modules 110a-110j may be implemented by the processing circuitry 110, possibly in cooperation with the communications interface 120 and the storage medium 130. The processing circuitry 110 may thus be arranged to from the storage medium 130 fetch instructions as provided by a functional module 110a-110j and to execute these instructions, thereby performing any steps of the D-IAB node 100 as disclosed herein.

Figure 9:
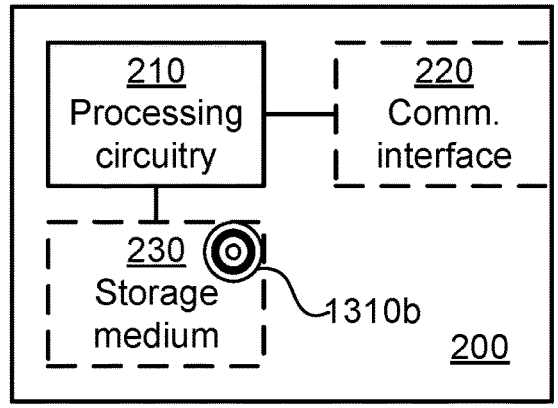
FIG. 9 is a schematic diagram showing functional units of an S-IAB node according to an embodiment.

FIG. 9 schematically illustrates, in terms of a number of functional units, the components of an S-IAB node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310b (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the S-IAB node 200 to perform a set of operations, or steps, as disclosed above. For example, the storage medium 230 may store the set of operations, and the processing circuitry 210 may be configured to retrieve the set of operations from the storage medium 230 to cause the S-IAB node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The S-IAB node 200 may further comprise a communications interface 220 for communications with the D-IAB node 100, the R-IAB node 300 and the UEs 50a:50N. As such the communications interface 220 may comprise one or more transmitters and receivers, comprising analogue and digital components.

The processing circuitry 210 controls the general operation of the S-IAB node 200 e.g. by sending data and control signals to the communications interface 220 and the storage medium 230, by receiving data and reports from the communications interface 220, and by retrieving data and instructions from the storage medium 230. Other components, as well as the related functionality, of the S-IAB node 200 are omitted in order not to obscure the concepts presented herein.

Figure 10:
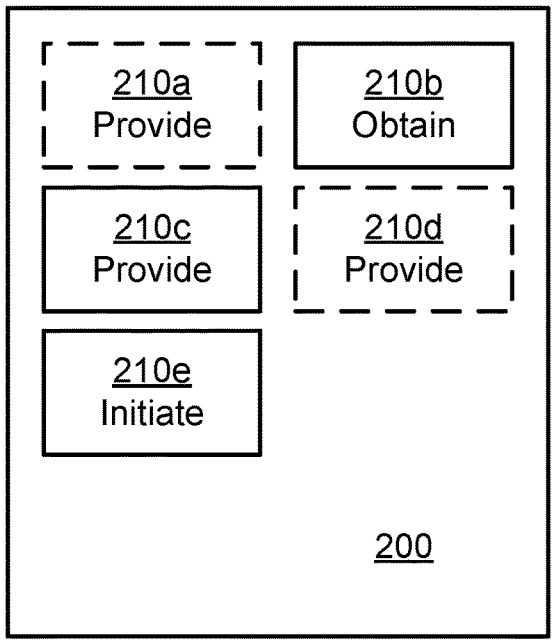
FIG. 10 is a schematic diagram showing functional modules of an S-IAB node according to an embodiment.

FIG. 10 schematically illustrates, in terms of a number of functional modules, the components of an S-IAB node 200 according to an embodiment. The S-IAB node 200 of FIG. 10 comprises a number of functional modules; an obtain module 210b configured to perform step S204, a provide module 210c configured to perform step S206, and an initiate module 210e configured to perform step S210. The S-IAB node 200 of FIG. 10 may further comprise a number of optional functional modules, such as any of a provide module 210a configured to perform step S202, and a provide module 210d configured to perform step S208. In general terms, each functional module 210a-210e may be implemented in hardware or in software. Preferably, one or more or all functional modules 210a-210e may be implemented by the processing circuitry 210, possibly in cooperation with the communications interface 220 and the storage medium 230. The processing circuitry 210 may thus be arranged to from the storage medium 230 fetch instructions as provided by a functional module 210a-210e and to execute these instructions, thereby performing any steps of the S-IAB node 200 as disclosed herein.

Figure 11:
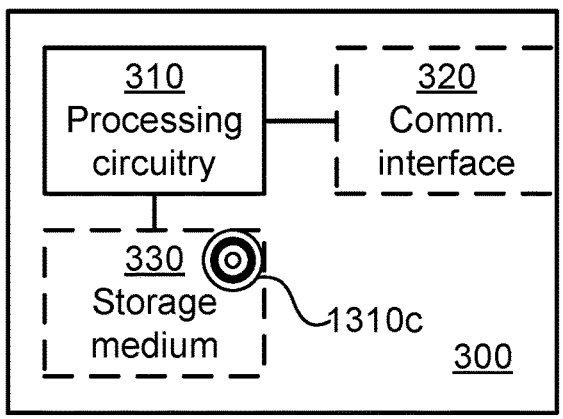
FIG. 11 is a schematic diagram showing functional units of an R-IAB node according to an embodiment.

FIG. 11 schematically illustrates, in terms of a number of functional units, the components of an R-IAB node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1310c (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the R-IAB node 300 to perform a set of operations, or steps, as disclosed above. For example, the storage medium 330 may store the set of operations, and the processing circuitry 310 may be configured to retrieve the set of operations from the storage medium 330 to cause the R-IAB node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The R-IAB node 300 may further comprise a communications interface 320 for communications with the S-IAB node 200, the D-IAB node 100 and the UEs 50a:50N. As such the communications interface 320 may comprise one or more transmitters and receivers, comprising analogue and digital components.

The processing circuitry 310 controls the general operation of the R-IAB node 300 e.g. by sending data and control signals to the communications interface 320 and the storage medium 330, by receiving data and reports from the communications interface 320, and by retrieving data and instructions from the storage medium 330. Other components, as well as the related functionality, of the R-IAB node 300 are omitted in order not to obscure the concepts presented herein.

Figure 12:
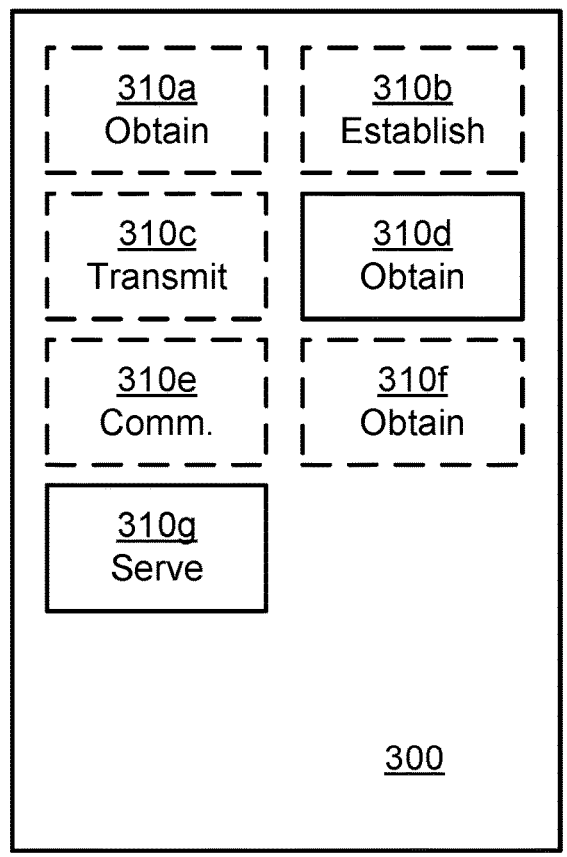
FIG. 12 is a schematic diagram showing functional modules of an R-IAB node according to an embodiment.

FIG. 12 schematically illustrates, in terms of a number of functional modules, the components of an R-IAB node 300 according to an embodiment. The R-IAB node 300 of FIG. 12 comprises a number of functional modules; an obtain module 310d configured to perform step S308, and a serve module 310g configured to perform step S314. The R-IAB node 300 of FIG. 12 may further comprise a number of optional functional modules, such as any of an obtain module 310a configured to perform step S302, an establish module 310b configured to perform step S304, a transmit module 310c configured to perform step S306, a communication module 310e configured to perform step S310, and an obtain module 310f configured to perform step S312.

In general terms, each functional module 310a-310g may be implemented in hardware or in software. Preferably, one or more or all functional modules 310a-310g may be implemented by the processing circuitry 310, possibly in cooperation with the communications interface 320 and the storage medium 330. The processing circuitry 310 may thus be arranged to from the storage medium 330 fetch instructions as provided by a functional module 310a-310g and to execute these instructions, thereby performing any steps of the R-IAB node 300 as disclosed herein.

Figure 13:
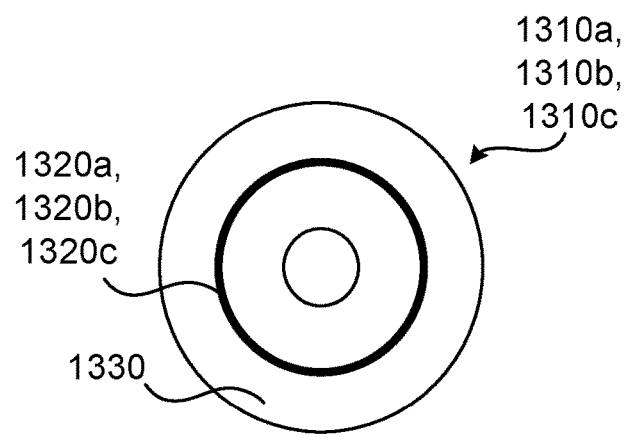
FIG. 13 shows one example of a computer program product comprising computer readable means according to an embodiment.

FIG. 13 shows one example of a computer program product 1310a, 1310b, 1310c comprising computer readable means 1330. On this computer readable means 1330, a computer program 1320a can be stored, which computer program 1320a can cause the processing circuitry 110 and thereto operatively coupled entities and devices, such as the communications interface 120 and the storage medium 130, to execute methods according to embodiments described herein. The computer program 1320a and/or computer program product 1310a may thus provide means for performing any steps of the D-IAB node 100 as herein disclosed. On this computer readable means 1330, a computer program 1320b can be stored, which computer program 1320b can cause the processing circuitry 210 and thereto operatively coupled entities and devices, such as the communications interface 220 and the storage medium 230, to execute methods according to embodiments described herein. The computer program 1320b and/or computer program product 1310b may thus provide means for performing any steps of the S-IAB node 200 as herein disclosed. On this computer readable means 1330, a computer program 1320c can be stored, which computer program 1320c can cause the processing circuitry 310 and thereto operatively coupled entities and devices, such as the communications interface 320 and the storage medium 330, to execute methods according to embodiments described herein. The computer program 1320c and/or computer program product 1310c may thus provide means for performing any steps of the R-IAB node 300 as herein disclosed.

In the example of FIG. 13, the computer program product 1310a, 1310b, 1310c is illustrated as an optical disc, such as a CD (compact disc) or a DVD (digital versatile disc) or a Blu-Ray disc. The computer program product 1310a, 1310b, 1310c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320a, 1320b, 1320c is here schematically shown as a track on the depicted optical disk, the computer program 1320a, 1320b, 1320c can be stored in any way which is suitable for the computer program product 1310a, 1310b, 1310c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for migrating UEs from a serving integrated access and backhaul, (S-IAB) node, node to a replacement integrated access and backhaul (R-IAB) node, node, the method being performed by a donor integrated access and backhaul (D-IAB) node of the S-IAB node and the R-IAB node, the method comprising:
obtaining a request for replacement of the S-IAB node;
providing, to the S-IAB node, an indication of replacement of the S-IAB node;
obtaining, from the S-IAB node, scheduling information for the UEs served by the S-IAB node;
forwarding, to the R-IAB node, the scheduling information; and
initiating migration of at least a subset of the UEs from the S-IAB node to the R-IAB node by providing instructions, via the S-IAB node, to at least the subset of the UEs to switch from being served by the S-IAB node to being served by the R-IAB node.

2. The method of claim 1, wherein the request for replacement of the S-IAB node is obtained from the S-IAB node or from an entity external to the D-IAB node, the S-IAB node, and the R-IAB node.

3. The method of claim 1, further comprising:
providing, upon having obtained the request for the replacement of the S-IAB node, instructions to the R-IAB node for the R-IAB node to be activated.

4. The method of claim 1, wherein the scheduling information is obtained and forwarded over a logic operations and maintenance channel or in an F1 Application Protocol message.

5. The method of claim 1, further comprising:
duplicating downlink data messages destined for the UEs for forwarding of the downlink data messages to both the S-IAB node and the R-IAB node whilst the UEs are still served by the S-IAB nod; and/or
receiving uplink messages originating from the UEs from both the S-IAB node and the R-IAB node whilst the UEs are still served by the S-IAB node.

6. The method of claim 1, wherein
the D-IAB node verifies that a trigger condition for migration of at least the subset of the UEs is fulfilled before initiating migration of at least the subset of the UEs, and
the trigger condition pertains to link quality between the UEs and R-IAB node, without pertaining to link quality between UEs and S-IAB node.

7. The method of claim 1, further comprising:
obtaining, from the S-IAB node, information of uplink grants according to which the UEs served by the S-IAB node are to send handover complete messages to the R-IAB node upon completion of the migration; and
forwarding the information of uplink grants to the R-IAB node, and wherein the UEs are notified of the uplink grants when being provided with the instructions from the D-IAB node.

8. The method of claim 1, wherein the subset of UEs is selected according to a criterion pertaining to a priority order as given by service type for the UEs.

9. The method of claim 1, wherein the UEs are instructed to switch from being served by the S-IAB node to being served by the R-IAB node by being instructed to use an identifier of the R-IAB node in all places where an identifier of the S-IAB node is used.

10. A method for migrating UEs from a serving integrated access and backhaul (S-IAB) node, node to a replacement integrated access and backhaul (R-IAB) node, node, the method being performed by the S-IAB node, the method comprising:
obtaining, from a donor integrated access and backhaul (D-IAB) node of the S-IAB node and the R-IAB node, an indication for replacement of the S-IAB node;
providing, to the R-IAB node and via the D-IAB node, scheduling information for the UEs served by the S-IAB node; and
initiating migration of at least a subset of the UEs from the S-IAB node to the R-IAB node by instructing, according to instructions from the D-IAB node, at least the subset of the UEs to switch from being served by the S-IAB node to being served by the R-IAB node.

11. The method of claim 10, further comprising:
providing, to the D-IAB node, a request for the replacement of the S-IAB node.

12. The method of claim 10, wherein the scheduling information is provided over a logic operations and maintenance channel or in an F1 Application Protocol message.

13. The method of claim 10, wherein, according to the scheduling information, number of transmit spatial layers to be used for transmission towards the UEs until the UEs have been migrated is fixed to 1.

14. The method of claim 10, wherein, according to the scheduling information, the R-IAB node is to use non-frequency selective wide-beam transmission when communicating with the UEs until the UEs have been migrated.

15. The method of claim 10, wherein the scheduling information for each of the UEs specifies at least one of: time/frequency resources, modulation and coding scheme, transmission rank, precoder to be used, reference signal configuration.

16. A method for migrating UEs from a serving integrated access and backhaul (S-IAB) node, node to a replacement integrated access and backhaul (R-IAB) node, node, the method being performed by the R-IAB node, the method comprising:
obtaining, from the S-IAB node and via a donor integrated access and backhaul (D-IAB) node of the S-IAB node and the R-IAB node, scheduling information for the UEs served by the S-IAB node; and
serving, according to the scheduling information, at least a subset of the UEs upon the subset of the UEs having migrated from being served by the S-IAB node to being served by the R-IAB node.

17. The method of claim 16, further comprising:
obtaining, from the D-IAB node, instructions for the R-IAB node to be activated;
in response to obtaining the instructions, establishing backhaul connectivity to the D-IAB node; and
transmitting a reference signal toward at least one of the UEs after establishing the backhaul connectivity to the D-IAB node.

18. The method of claim 16, wherein the scheduling information is obtained over a logic operations and maintenance channel or in an F1 Application Protocol message.

19. The method of claim 16, wherein, according to the scheduling information, number of transmit spatial layers to be used for transmission towards the UEs until the UEs have been migrated is fixed to 1.

20. The method of claim 16, wherein, according to the scheduling information, the R-IAB node is to use non-frequency selective wide-beam transmission when communicating with the UEs until the UEs have been migrated.

21. The method of claim 16, wherein the scheduling information for each of the UEs specifies at least one of: time/frequency resources, modulation and coding scheme, transmission rank, precoder to be used, reference signal configuration.

22. The method of claim 16, further comprising:
communicating downlink data messages and uplink data messages with the UEs according to the scheduling information whilst the UEs are still served by the S-IAB node.

23. The method of claim 16, further comprising:
obtaining, from the S-IAB node and via the D-IAB node, information of uplink grants according to which the UEs served by the S-IAB node are to send handover complete messages to the R-IAB node upon completion of the migration.

24. A donor integrated access and backhaul (D-IAB) node for migrating UEs from a serving integrated access and backhaul (S-IAB) node, node to a replacement integrated access and backhaul (R-IAB) node, node, the D-IAB node comprising processing circuitry, the processing circuitry being configured to cause the D-IAB node to:
obtain a request for replacement of the S-IAB node;
provide, to the S-IAB node, an indication of replacement of the S-IAB node;
obtain, from the S-IAB node, scheduling information for the UEs served by the S-IAB node;
forward, to the R-IAB node, the scheduling information; and
initiate migration of at least a subset of the UEs from the S-IAB node to the R-IAB node by providing instructions, via the S-IAB node, to at least the subset of the UEs to switch from being served by the S-IAB node to being served by the R-IAB node.

25. A serving integrated access and backhaul (S-IAB) node, node for migrating UEs from the S-IAB node to a replacement integrated access and backhaul (R-IAB) node, node, the S-IAB node comprising processing circuitry, the processing circuitry being configured to cause the the S-IAB node to:
obtain, from a donor integrated access and backhaul (D-IAB) node of the S-IAB node and the R-IAB node, an indication for replacement of the S-IAB node;
provide, to the R-IAB node and via the D-IAB node, scheduling information for the UEs served by the S-IAB node; and
initiate migration of at least a subset of the UEs from the S-IAB node to the R-IAB node by instructing, according to instructions from the D-IAB node, at least the subset of the UEs to switch from being served by the S-IAB node to being served by the R-IAB node.

26. A replacement integrated access and backhaul (R-IAB) node, node for migrating UEs from a serving integrated access and backhaul (S-IAB) node, node to the R-IAB node, the R-IAB node comprising processing circuitry, the processing circuitry being configured to cause the R-IAB node to:
obtain, from the S-IAB node and via a donor integrated access and backhaul (D-IAB) node of the S-IAB node and the R-IAB node, scheduling information for the UEs served by the S-IAB node; and
serve, according to the scheduling information, at least a subset of the UEs upon the subset of the UEs having migrated from being served by the S-IAB node to being served by the R-IAB node.

* * * * *